Feb. 6, 1940.                O. O. RIESER                2,189,327
STORAGE BATTERY CONSTRUCTION
Filed April 28, 1938
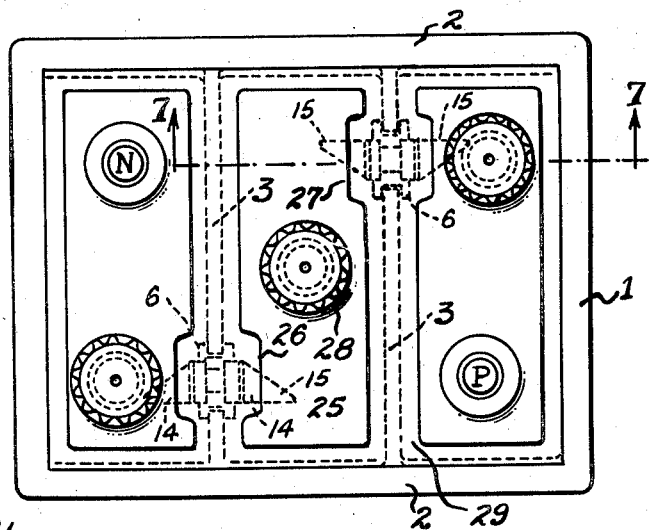
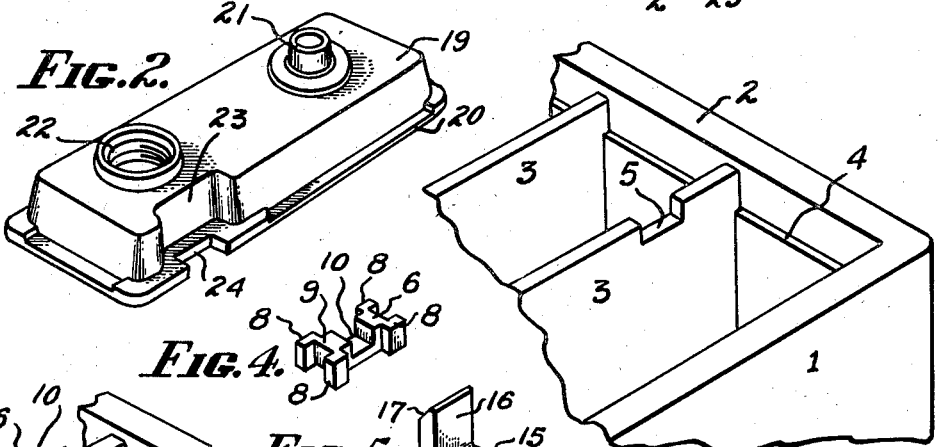
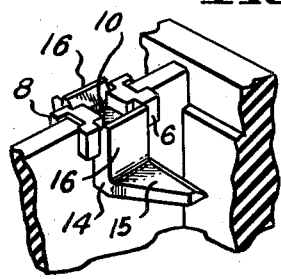
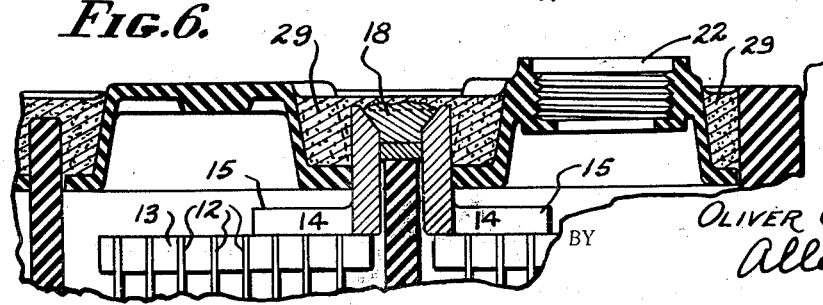
INVENTOR.
OLIVER O. RIESER.
BY Allen + Allen
ATTORNEYS.

Patented Feb. 6, 1940

2,189,327

UNITED STATES PATENT OFFICE 2,189,327

STORAGE BATTERY CONSTRUCTION

Oliver O. Rieser, Oak Park, Ill., assignor to The Richardson Company, Lockland, Ohio, a corporation of Ohio Application April 28, 1938, Serial No. 204,821

17 Claims. (Cl. 136—134)

My invention relates to a construction of electric storage batteries, to parts therefor, and to the assembly thereof, the storage battery being of a type in which there is a connection between the plate assemblies of different cells made essentially through the cell defining partitions or at least in the space between the cell covers, which space is filled with a sealing compound. It has hereto been proposed to mold into a partition wall of a storage battery box or case a metallic member, or insert of lead, to which lugs on the plate assemblies in the cells may be burned. Certain obvious disadvantages inhere in this structure, and in the manufacture of it. It has also been proposed to place over a partition a strap-like member to which the plate assembly lugs may be burned. This again has certain disadvantages and involves space difficulties in the storage battery.

It is an object of my invention to provide a new and improved structure for storage batteries of the type referred to, and in such structure to simplify the manufacture of the storage battery case, to simplify the assembly of the storage battery, to provide a good space factor in the storage battery while securing adequate anchorage of the plate assembly, and to provide means for adequate electric contact between adjacent plate assemblies. It is an object to provide a structure which does not weaken the partition walls. It is an object to provide a structure which allows considerable dimensional and positional tolerances in the plate assemblies. It is a purpose of my invention to provide a structure which does not leave a gap through the partition above the acid line of the storage battery.

These and other objects of my invention, which will be set forth hereinafter or will be apparent to one skilled in the art upon reading this specification, I accomplish by that certain construction and arrangement of parts of which I shall now set forth an exemplary embodiment. Reference is made to the drawing wherein Figure 1 is a top plan view of a storage battery constructed and assembled in accordance with my invention.

Figure 2 is a perspective view of a cell cover structure which I prefer to employ.

Figure 3 is a perspective view of a corner of a storage battery case which has been prepared for use in accordance with my invention.

Figure 4 is a perspective view of a metallic connector member which I employ.

Figure 5 is a fragmentary perspective view showing the relationship of a plate assembly lug to a plate assembly.

Figure 6 is a perspective view of a portion of a battery box showing the member of Figure 4 in position and the relationship thereto of plate assembly lugs.

Figure 7 is a partial sectional view taken along the lines 7—7 of Figure 1.

In the several views I have shown a storage battery container having end walls 1, side walls 2, and partition members 3. This is of usual construction with an exception presently to be noted. The storage battery case will preferably be formed as to certain of its walls at least with supporting ledges 4 for the cell covers.

The partition members 3 each have small rectangular cut-away portions indicated at 5 in Figure 3. The cut-away portion in one partition will occur near one side wall; in the next partition it will occur near the opposite side wall and so on. The cut-away portions are conveniently formed by appropriate configurations on the male plunger assembly of the press used in molding the storage battery cases; but it will be clear that ordinary storage battery cases may be fitted for use in accordance with my invention by merely cutting these rectangular depressions in the partition walls. This may readily be done in commercial production by the provision of a suitable jig containing cutting or grinding tools as will be readily understood.

The cut-away portion 5 of the partition wall 3 is intended to accept a metallic member illustrated in Figure 4. This member has a body 6 of generally rectangular shape having a general depth equivalent to the depth of the depression 5 in the partition wall. The width of the body 6 will preferably be substantially the width of the partition wall. At each end of the body 6 there are ears 8 interspaced from each other the width of the partition wall and projecting beyond the body 6. This enables the device of Figure 4 to be placed on the partition in the recess 5 as shown most clearly in Figure 6. When so put into position the device will hold its place. For convenience in the other figures the device of Figure 4 has been given the general index numeral 9. The body 6 of the device may conveniently be recessed from above as clearly shown at 10 in Figure 4 for a purpose which will hereinafter be made clear.

The devices 9 are formed of lead, or of antimonial lead which will be inert to battery acid, and may conveniently be made rapidly, in large quantities, and economically, by a pressure die casting operation.

In each cell of the storage battery there will be, of course, plate assemblies of opposite polarity with separators between adjacent plates. A portion of a plate assembly of one polarity is shown in Figure 5 where the individual plates are indicated at 11, having ears 12 which are joined in the usual way to a bus bar 13. To the bus bar is attached a lug member indicated generally at 14. This is of angular formation having a portion 15 which will lie along the bus bar 13 and can be burned or otherwise joined to it. It also has a riser 16, the outer edge of which may be beveled as at 17.

As will be readily understood from Figures 6 and 7, in building up the storage batteries the plate assemblies are placed in the several cells. In the first cell at either end there will be a plate assembly of one polarity, the bus bar of which is provided with the usual terminal post (N or P in Figure 1): the plate assembly of the opposite polarity will be provided with a lug 14. In the central cell of a three cell storage battery, or in all cells of a storage battery intermediate the end ones, the plate assemblies of both polarities will be provided with the lugs 14. When the several plate assemblies are placed in the cells, the lugs 14 will lie as most clearly shown in Figure 6 along the bodies 6 of the devices 9 between ears 8 on the same sides thereof. This relationship is also illustrated in Figure 1 and Figure 7. In electrical storage batteries plate assemblies of opposite polarity are usually connected together so as electrically to connect all cells in series.

It will be noted that by reason of the construction of the members 9 considerable tolerance in the heights of the risers 16 of the lugs 14 is permitted. The risers 16 on either side of the bodies 6 of the members 9 define, with the cut-away portion 10 of the members 9, a depression for the reception of molten metal. The lugs 14 are burned to the member 9 as illustrated at 18 in Figure 7.

It is not necessary in all instances to provide the depression 10 in the member 9. Where this is not done, the beveled portion 17 of the lugs 14 will provide spaces for the reception of molten metal against the body 6 of the devices 9. However, this usually requires something in the nature of a double burning operation for joining each of the lugs 14 to the members 9.

It will be observed from my several figures that connections across the partitions between plate assemblies in the several cells are effected substantially along the top line and substantially between the cell covers. This eliminates the necessity for the use of the familiar connector members above the cell covers. It also simplifies the construction of the cell covers. My storage batteries are not limited to the use of any particular type of cell cover. I have illustrated in Figure 2 an exemplary one having a body of the usual height 19 and the usual flanges 20. This is a cell cover for an end cell of the battery illustrated in Figure 1. It has but one terminal post opening, indicated at 21. The particular type of this opening is not of importance. The particular one illustrated is a type having a lead bushing. The filling opening 22 is located near one end of the cell cover as at 23. The body of the cell cover is somewhat recessed leaving a broader flange which in turn is recessed as at 24 to accommodate the member 9 and/or the lugs 14 which have been burned to it. The central cell cover illustrated at 25 in Figure 1 does not have any opening having a terminal post, but is recessed near both ends as at 26 and 27. The filling opening may be located centrally as at 28.

Ordinarily it will be found necessary to cut away the cell cover flange as at 24 only sufficiently to accommodate the riser 16 of the plate assembly lug. When this is done, the usual assembly procedure is first to place the plate groups in the cells in proper relationship, then put on the cell covers (which rest on the flanges 4), then insert the members 9 in the depressions 5 in the partition walls (the beveled edges 17 of the risers 16 facilitating this operation), then burn the members 16 to the members 9, and finally to pour the sealing compound into the spaces between the cell covers. This gives an interlocking construction since portions of the cell cover flanges underlie the ears 8 of the connecter members. The sealing compound is indicated in Figure 1 and Figure 7 at 29. The sealing compound may be caused to cover the members 9 and the juncture of the lugs 14. Thus the connector members are covered with the sealing compound and are protected from acid attack and corrosion, at least above the surface of the storage battery top. However, if desired these members may be left exposed for testing purposes. It will be understood that modifications may be made in my invention without departing from the spirit of it.

Having thus described my invention, what I claim as new and desire to secure by Letters Patent is:

1. Connecter means for use in the electric storage battery, said connecter means having substantially rectangular bodies and ears projecting therefrom at each end both laterally and longitudinally, said ears at each end being interspaced from each other substantially the distance of the thickness of the body.

2. Connecter means for use in the electric storage battery, said connecter means having substantially rectangular bodies and ears projecting therefrom at each end both laterally and longitudinally, said ears at each end being interspaced from each other substantially the distance of the thickness of the body, said body being recessed centrally.

3. In a storage battery case, partition members, said partition members each having a recess in the upper portion thereof, and metallic members located in said recesses, each of said metallic members having a body of approximately the thickness of said partition members and lying in said recess, and ears at the ends of said bodies extending both laterally and longitudinally beyond each of said ends, said ears at each end being interspaced approximately the thickness of said partitions and serving to retain said bodies in said recesses in said partitions.

4. In a storage battery case, partition members, said partition members each having a recess in the upper portion thereof and metallic members located in said recesses, each of said metallic members having a body of approximately the thickness of said partition members and lying in said recess, and ears at the ends of said bodies extending both laterally and longitudinally beyond each of said ends, said ears at each end being interspaced approximately the thickness of said partitions and serving to retain said bodies in said recesses in said partitions, and recesses in the top portions of said bodies.

5. In a storage battery case, partition members, said partition members each having a recess in the upper portion thereof and metallic members located in said recesses, each of said metallic members having a body of approximately the thickness of said partition members and lying in said recess, and ears at the ends of said bodies extending both laterally and longitudinally beyond each of said ends, said ears at each end being interspaced approximately the thickness of said partitions and serving to retain said bodies in said recesses in said partitions, and recesses in the top portions of said bodies, said ears being substantially rectangular in formation, said ears at opposite ends of said bodies being interspaced to define a space for the reception of a lug from a plate assembly.

6. In combination in an electric storage battery having a case, partitions in said case, recesses in the top edges of said partitions respectively, and metallic members in said recesses said members comprising a body portion of approximately the thickness of said partitions and lying in said recesses, and end members in the form of ears extending both laterally and longitudinally from said body members and lying on either side of said partitions at each end of said body members.

7. In combination in an electric storage battery having a case, partitions in said case, recesses in the top edges of said partitions respectively, and metallic members in said recesses said members comprising a body portion of approximately the thickness of said partitions and lying in said recesses, and end members in the form of ears extending both laterally and longitudinally from each end of said body members and lying on either side of said partitions at each end of said body members, plate assemblies in the cells defined by said partitions, lugs on said plate assemblies, said lugs lying adjacent each side respectively of said metallic members and essentially between the ears thereof.

8. In combination in an electric storage battery having a case, partitions in said case, recesses in the top edges of said partitions respectively, and metallic members in said recesses said members comprising a body portion of approximately the thickness of said partitions and lying in said recesses, and end members in the form of ears extending both laterally and longitudinally from each end of said body members and lying on either side of said partitions at each end of said body members, plate assemblies in the cells defined by said partitions, lugs on said plate assemblies, said lugs lying adjacent each side respectively of said metallic members and essentially between the ears thereof, said body portions of metallic members being recessed whereby each of said members and its said lugs define a reservoir for molten material in burning said lugs to said metallic members.

9. In combination in an electric storage battery having a case, partitions in said case, recesses in the top edges of said partitions respectively, and metallic members in said recesses said members comprising a body portion of approximately the thickness of said partitions and lying in said recesses, and end members in the form of ears extending both laterally and longitudinally from each end of said body members and lying on either side of said partitions at each end of said body members, plate assemblies in the cells defined by said partitions, lugs on said plate assemblies, said lugs lying adjacent each side respectively of said metallic members and essentially between the ears thereof, said body portion of said metallic members being recessed whereby each of said members and its said lugs define a reservoir for molten material in burning said lugs to said metallic members, and cover members for said several cells comprising bodies and flanges, the bodies and flanges of said members being recessed to accommodate said lugs whereby said metallic members and the portion of said lugs joined thereto are located essentially between the bodies of said cover members.

10. In combination in an electric storage battery having a case, partitions in said case, recesses in the top edges of said partitions respectively, and metallic members in said recesses, said members comprising a body portion of approximately the thickness of said partitions and lying in said recesses, and end members in the form of ears extending both laterally and longitudinally from each end of said body members and lying on either side of said partitions at each end of said body members, plate assemblies in the cells defined by said partitions, lugs on said plate assemblies, said lugs lying adjacent each side respectively of said metallic members and essentially between the ears thereof, said body portions of said metallic members being recessed whereby each of said members and its said lugs define a reservoir for molten material in burning said lugs to said metallic members, and cover members for said several cells comprising bodies and flanges, the bodies and flanges of said members being recessed to accommodate said lugs whereby said metallic members and the portion of said lugs joined thereto are located essentially between the bodies of said cover members, a sealing compound in the spaces between said cover members and surrounding in part at least said metallic members and the portion of said lugs joined thereto.

11. In combination in an electric storage battery having a case, partitions in said case, recesses in the top edges of said partitions respectively, and metallic members in said recesses, said members comprising a body portion of approximately the thickness of said partitons and lying in said recesses, and end members in the form of ears extending both laterally and longitudinally from each end of said body members and lying on either side of said partitions at each end of said body members, plate assemblies in the cells defined by said partitions, lugs on said plate assemblies, said lugs lying adjacent each side respectively of said metallic members and essentially between the ears thereof; said body portions of said metallic members being recessed whereby each of said members and its said lugs define a reservoir for molten material in burning said lugs to said metallic members, and cover members for said several cells comprising bodies and flanges, the bodies and flanges of said members being recessed to accommodate said lugs whereby said metallic members and the portion of said lugs joined thereto are located essentially between the bodies of said cover members, a sealing compound in the spaces between said cover members and surrounding in part at least said metallic members and the portion of said lugs joined thereto, a portion of said cell cover flanges at least underlying said ears on said metallic members.

12. In combination in an electric storage battery a case having partitions, said partitions being recessed at the top, metallic members having bodies lying in said recesses and of substantially the same width, ears on each end of said bodies extending therefrom both laterally and longitudinally and interspaced transversely substantially the width of said partitions and interspaced longitudinally substantially the width of plate lugs, and plate lugs lying on either side of said bodies between said ears.

13. In combination in an electric storage battery a case having partitions, said partitions being recessed at the top, metallic members having bodies lying in said recesses and of substantially the same width, ears on each end of said bodies extending therefrom both laterally and longitudinally and interspaced transversely substantially the width of said partitions and interspaced longitudinally substantially the width of plate lugs, and plate lugs lying on either side of said bodies between said ears, said plate lugs being of angular formation having wall portions and risers lying between said ears.

14. In combination in an electric storage battery a case having partitions, said partitions being recessed at the top, metallic members having bodies lying in said recesses and of substantially the same width, ears on each end of said bodies extending therefrom both laterally and longitudinally and interspaced transversely substantially the width of said partitions and interspaced longitudinally substantially the width of plate lugs, and plate lugs lying on either side of said bodies between said ears, said plate lugs being of angular formation having wall portions and risers lying between said ears, said risers having beveled edges.

15. In combination in an electric storage battery a case having partitions, said partitions being recessed at the top, metallic members having bodies lying in said recesses and of substantially the same width, ears on each end of said bodies extending therefrom both laterally and longitudinally and interspaced transversely substantially the width of said partitions and interspaced longitudinally substantially the width of plate lugs, and plate lugs lying on either side of said bodies between said ears, said plate lugs being of angular formation having wall portions and risers lying between said ears, said risers having beveled edges.

16. As a connecting means in an electric storage battery a metallic body of elongated formation the ends of which body are recessed substantially the width of a battery case partition, the sides of which body are recessed substantially the width of a plate assembly lug, the side recesses being of sufficient depth to leave the central portion of said device of substantially the width of a partition.

17. As a connecting means in an electric storage battery, a metallic body of elongated formation the ends of which body are recessed substantially the width of a battery case partition, the sides of which body are recessed substantially the width of a plate assembly lug, the side recesses being of sufficient depth to leave the central portion of said device of substantially the width of a partition, said member being flat beneath, the upper portion of said member being recessed to a depth less than the depth of said body, said last mentioned recess having a depth less than the width of the recesses formed in the sides thereof.

OLIVER O. RIESER.